(12) United States Patent
Imaeda

(10) Patent No.: US 8,071,003 B2
(45) Date of Patent: Dec. 6, 2011

(54) METHOD OF MANUFACTURING A VIBRATION DAMPING BUSHING

(75) Inventor: Kenichiro Imaeda, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 890 days.

(21) Appl. No.: 12/076,823

(22) Filed: Mar. 24, 2008

(65) Prior Publication Data
US 2008/0237951 A1    Oct. 2, 2008

(30) Foreign Application Priority Data
Mar. 26, 2007   (JP) ................................ 2007-079743

(51) Int. Cl.
B29C 45/14    (2006.01)

(52) U.S. Cl. ......... 264/262; 264/261; 264/275; 264/277

(58) Field of Classification Search ........................ None
See application file for complete search history.

(56) References Cited

U.S. PATENT DOCUMENTS

| 2,351,329 | A | * | 6/1944 | Gerstenmaier | 264/138 |
| 2,689,755 | A | * | 9/1954 | Krotz | 403/221 |
| 3,608,049 | A | * | 9/1971 | Tavella | 264/229 |
| 6,394,779 | B1 | * | 5/2002 | Komazawa et al. | 425/123 |

FOREIGN PATENT DOCUMENTS

| JP | 03065313 | * | 3/1991 |
| JP | A-03-65313 |   | 3/1991 |
| JP | A-9-72365 |   | 3/1997 |
| JP | A-11-141612 |   | 5/1999 |
| JP | 2000043062 | * | 2/2000 |

* cited by examiner

*Primary Examiner* — Edmund H. Lee
(74) *Attorney, Agent, or Firm* — Oliff & Berridge, PLC

(57) ABSTRACT

A method of manufacturing a vibration damping bushing wherein after setting a main shaft member on a lower mold, an medial sleeve is set to be disposed about the main shaft member, and a plurality of sections are moved forward in a centripetal direction to form an intermediate mold together, and then an upper mold is superposed onto the intermediate mold to form a mold cavity therein. At least one positioning protrusion is formed on a cavity defining face, being discontinuous in a circumferential direction, while being located at either semi-circumference of the cavity defining face with any diametric line interposed therebetween. The medial sleeve is set in position in an axis-perpendicular direction within the mold cavity by holding the positioning protrusions in contact against an outer peripheral face of the medial sleeve. A vibration damping bushing manufactured by this method is also disclosed.

4 Claims, 4 Drawing Sheets

METHOD OF MANUFACTURING A VIBRATION DAMPING BUSHING

INCORPORATED BY REFERENCE

The disclosure of Japanese Patent Application No. 2007-079743 filed on Mar. 26, 2007 including the specification, drawings and abstract is incorporated herein by reference in its entirety.

BACKGROUND OF THE INVENTION

1. Field of the Invention

The present invention relates to a vibration damping bushing adapted to provide vibration damping linkage to two components for which vibration transmission is to be prevented in an automobile, or alternatively adapted to provide vibration damping mounting of one of the two components on the other in a vibration damping fashion. The present invention also relates to a method of producing the same.

2. Description of the Related Art

Conventionally, suspensions for automobiles and the like have commonly employed vibration damping bushings composed of a main shaft member, a rubber elastic body of tubular shape affixed to the outside peripheral face of the main shaft member, and a medial sleeve of tubular shape embedded coaxially in the medial region of the rubber elastic body in the direction of its thickness. This vibration damping bushing is of press fit design, intended to be used by press-fitting the rubber elastic body directly into a mounting hole, or press-fitting the rubber elastic body into an outer tube member, then press-fitting the outer tube member into a mounting hole.

As disclosed in JP-A-9-72365 and JP-A-11-141612 for example, vibration damping bushings of this kind are manufactured typically through vulcanization molding of a rubber material together with the main shaft member and the medial sleeve which have been positioned in the mold, thereby integrally molding the rubber elastic body with these components. The mold assembly used for this process is composed, for example, of an upper mold and a lower mold positioned spaced some distance apart in the vertical direction, and intermediate molds split into several sections in the circumferential direction and positioned extendably and retractably in the centripetal direction between the upper and lower molds.

Where a vibration damping bushing is manufactured using this type of mold assembly, first, the main shaft member and the medial sleeve are disposed resting upright (i.e. oriented with the axial direction aligned with the vertical) and disposed concentrically, with a first end thereof (the lower end) positioned on a positioning member disposed on the upper face of the lower mold of the mold assembly. Next, the lower mold is transported to a prescribed location, the intermediate molds are moved in the centripetal direction and set with respect to the lower mold, then again transported to a prescribed location where the upper mold is set and the mold assembly is locked. The mold assembly is then moved to the location of the vulcanizer where the vulcanizer injects rubber material into the mold cavity and carries out vulcanization molding. Then, prescribed post-processing steps are carried out to complete the vibration damping bushing.

Where a vibration damping bushing is manufactured in the above manner, the main shaft member and the medial sleeve are positioned concentrically by a positioning member disposed on the upper face of the lower mold of the mold assembly. At this time, while the main shaft member can be held in stable condition by the positioning member, for structural reasons portion of the medial sleeve held by the positioning member (i.e. the portion projecting from the axial end face of the rubber elastic body) is insufficient. Moreover, since there is dimensional variation (tolerance) of the medial sleeve, it is necessary to leave a gap (gutter) in the diametrical direction between the medial sleeve and the positioning member, so that the sleeve tends to be held in an unstable condition.

Thus, when the lower mold is transported to the prescribed location for the next process, the medial sleeve can easily shift out of position, for example, assuming a tilted state, or running up onto the positioning member. If the medial sleeve should shift out of position in this way, when the intermediate molds and the upper mold are set, the mold assembly or medial sleeve may become broken or deformed. Also, if vulcanization molding is carried out with the medial sleeve shifted out of position, dimensional accuracy of the product will be poor so that characteristics vary appreciably, or defective products may occur.

In order to prevent the medial sleeve from shifting out of position in this way, it may be contemplated to extend the length of the medial sleeve projecting beyond the axial end face of the rubber elastic body. However, since it is necessary to avoid interference with other components situated in proximity to the vibration damping bushing, there is a limit as to how much the length of the medial sleeve can be extended.

SUMMARY OF THE INVENTION

It is therefore an object of the present invention to provide a vibration damping bushing that affords improved dimensional accuracy and reduced variability of characteristics, as well as a method for manufacturing it.

A method of manufacturing a vibration damping bushing including (i) a main shaft member, (ii) a rubber elastic body of tubular shape affixed to an outside peripheral face of the main shaft member, and (iii) a medial sleeve of tubular shape embedded coaxially in a medial region of the rubber elastic body in a thickness-wise direction thereof, the method comprising the steps of: (A) employing a mold assembly composed of an upper mold and a lower mold positioned spaced a distance apart in a vertical direction, and an intermediate mold to form a tubular cavity defining face extending about a center axis vertically extending between the upper and lower molds, said intermediate mold being split a plurality of sections in a circumferential direction of the cavity defining face, with each of the plurality of sections movable forward and backward in a centripetal direction between the upper and lower molds; (B) after setting in the mold assembly the main shaft member and the medial sleeve so as to be positioned coaxially with each center axis extending in the vertical direction between the upper and lower molds, filling a mold cavity of the mold assembly with a rubber material and then the rubber material is vulcanized so that the rubber elastic body is simultaneously bonded to the main shaft member and the medial sleeve, wherein after setting the main shaft member on the lower mold so as to project vertically upward while positioning a lower end of the main shaft member with respect to the lower mold, the medial sleeve is set so as to be disposed about the main shaft member, and the plurality of sections are moved forward in the centripetal direction from an outer peripheral side to form the intermediate mold together, and then the upper mold is superposed onto the intermediate mold from a vertically upper side to form the mold cavity therein, and wherein at least one positioning protrusion is formed on the cavity defining face, the positioning protrusion being discontinuous in the circumferential direction, while being located at either semi-circumference of the cavity defining face with any diametric line interposed therebetween, and the medial sleeve is set in position in an axis-perpendicular direction within the mold cavity by holding the positioning protrusions in contact against an outer peripheral face of the medial sleeve.

In the method of manufacturing the vibration damping bushing of the present invention, during the process of vulcanization molding of the rubber elastic body, the medial sleeve resting on the lower mold is positioned in the diametrical direction by at least one positioning protrusion, which is discontinuous in the circumferential direction, but is located at either semi-circumference of the cavity defining face with any diametric line interposed therebetween. Therefore, when the plurality of sections of the intermediate mold move in the centripetal direction, i.e. radial directions of the intermediate mold, the mold defining face is formed within the intermediate mold with the at least one positioning protrusion support the medial sleeve from the both semi-circumference side of the cavity defining face with any diametric line interposed therebetween. This arrangement improves the accuracy of positioning of the medial sleeve relative to the lower mold, as well as improving coaxiality of the medial sleeve with respect to the main shaft member. It is therefore possible to carry out vulcanization molding with the medial sleeve positioned accurately within the mold assembly, so as to improve dimensional accuracy and reduce variability of characteristics of the vibration damping bushing manufactured thereby. It should be noted that each section of the intermediate mold has a circumferential length not greater than a semi-circumference of the intermediate mold. In addition, the at least one positioning protrusion has a discontinuous region in the circumferential direction. Namely, if one positioning protrusion is employed, both circumferential ends thereof are spaced from each other in the circumferential direction so as to form a circumferential gap. In order to meet that the positioning protrusion be located at either semi-circumference of the cavity defining face with any diametric line interposed therebetween, the single positioning protrusion should have a circumferential length greater than a semi-circumference of the cavity defining face. Alternatively, if a plurality of positioning protrusions are employed, the positioning protrusions are spaced away from one another in the circumferential direction so as to circumferential gaps therebetween. The circumferential gap(s) is needed to permit sufficient flow of a rubber material within the mold cavity in sufficient manner.

In the preferred mode of the present invention, the at least one positioning protrusion comprises three or more positioning protrusions separated from one another in the circumferential direction. More preferably, the positioning protrusions are disposed at three or more locations along the circumferential direction of the cavity defining face of the intermediate molds while being situated at equal intervals. In another preferred practice, the positioning protrusions will preferably be disposed at two or more locations lying in the axial direction. In this case, more preferably, one of the two locations is situated above an axially center portion of the cavity defining face. This can correct tilting of the medial sleeve in the axial direction. By providing these positioning protrusions, depressions corresponding to the positioning protrusions will be formed on the outside peripheral face of the rubber elastic body formed through vulcanization molding. Thus, in consideration of possible effects on the characteristics and durability of the rubber elastic body, it is preferable for the positioning protrusions to be situated at regions of thinnest wall thickness of the rubber elastic body which is positioned to the outer peripheral side of the medial sleeve, and the positioning protrusions will preferably be small enough that the required strength is assured.

In the present invention, the lower mold of the mold assembly is preferably furnished with a positioning portion for the purpose of positioning the lower end portion of the medial sleeve as it rests on the lower mold. This positioning portion can be constituted by ring-shaped groove extending in the circumferential direction, for example. This groove may be disposed continuously or in discontinuous segments in the circumferential direction. Where the groove is disposed in discontinuous segments, the loss of material in the rubber elastic body due to the positioning portion will be smaller. Where the lower mold is provided with a positioning portion for the medial sleeve in this way, the positioning protrusions provided to the intermediate molds will preferably be situated towards the upper side of the intermediate molds. This is so that tilting of the medial sleeve in the axial direction can be corrected to good advantage.

A vibration damping bushing according to the present invention for addressing the above problem resides in a vibration damping bushing manufactured by the manufacturing method pertaining to the present invention, characterized in that vulcanization molding is carried out with the outside peripheral face of the medial sleeve positioned by positioning protrusions disposed on the intermediate molds, thereby forming on the outside peripheral face of the rubber elastic body depressions which correspond to the positioning protrusions.

In the vibration damping bushing which pertains to the present invention, depressions corresponding to the positioning protrusions provided on the intermediate molds are formed on the outside peripheral face of the rubber elastic body during vulcanization molding of the rubber elastic body. Specifically, this vibration damping bushing affords improved dimensional accuracy and minimal variability of characteristics, due to the improved accuracy of positioning of the medial sleeve with respect to the mold assembly and the good coaxiality of the medial sleeve with respect of the main shaft member and the rubber elastic body.

In consideration of possible effects on characteristics and durability, the depressions formed on the outside peripheral face of the rubber elastic body in the present invention will preferably be formed at regions of thinnest wall thickness of the rubber elastic body which is positioned to the outer peripheral side of the medial sleeve. Moreover, since it is preferable for the depressions to be small, the positioning protrusions disposed on the mold assembly will preferably be formed with small size.

According to the method of manufacturing a vibration damping bushing which pertains to the present invention, the main shaft member and the medial sleeve are positioned coaxially and resting in a vertical attitude on the lower mold, the intermediate molds are then moved in the centripetal direction, and vulcanization molding of the rubber elastic body is carried out with the outside peripheral face of the medial sleeve positioned by positioning protrusions disposed at three or more locations along the circumferential direction of the cavity wall of the intermediate molds, thus affording improving dimensional accuracy and reducing variability of characteristics.

According to the vibration damping bushing which pertains to the present invention, vulcanization molding is carried out with the outside peripheral face of the medial sleeve positioned by positioning protrusions disposed on the intermediate molds, thereby forming on the outside peripheral face of the rubber elastic body depressions which correspond to the positioning protrusions.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
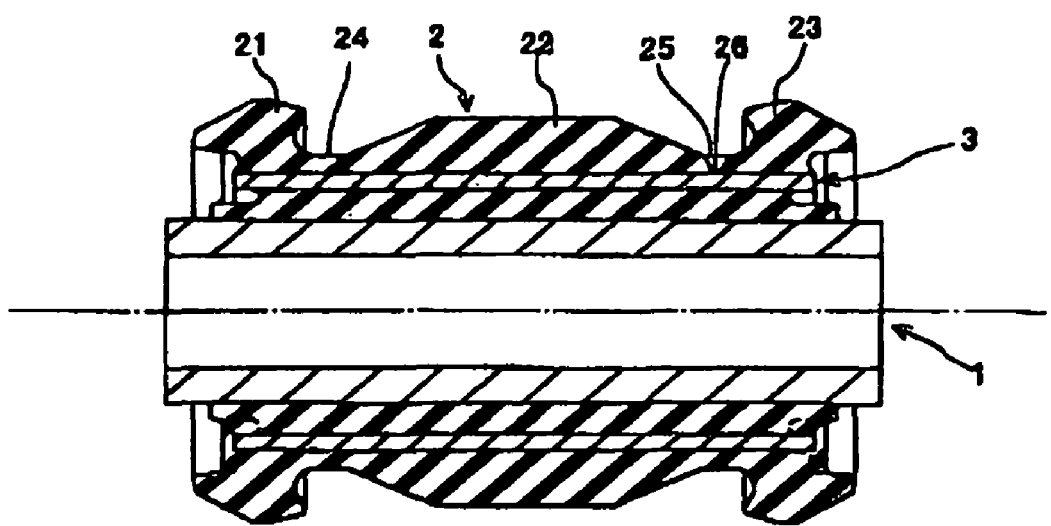
FIG. 1 is a vertical cross sectional view of a vibration damping bushing manufactured by a method of the present invention, taken along line 1-1 of FIG. 2.
Figure 2:
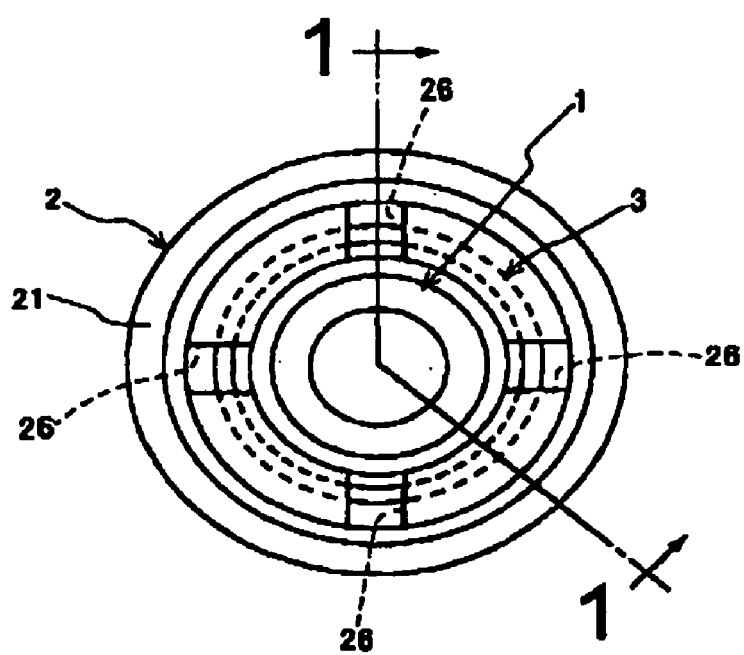
FIG. 2 is a top plane view of the vibration damping bushing of FIG. 1.

FIGS. 1 and 2 depict a vibration damping bushing manufactured according to a preferred embodiment of the present invention. The vibration damping bushing includes; a main shaft member 1 of thick-walled tubular shape; a rubber elastic body 2 of tubular shape affixed to the outside peripheral face of the main shaft member 1; and a medial sleeve 3 of tubular shape embedded in the medial region of the rubber elastic body 2 in the direction of its thickness and coaxial with the main shaft member 1 and the rubber elastic body 2. The rubber elastic body 2 has a central thick walled portion 22 and a pair of thick large-diameter portions 21, 23 that bulge diametrical outward situated at three locations in its axial center section and at either end, forming a pair of thin small-diameter portions 24, 25 recessed diametrically inward between the central thick walled portion 22 and the neighboring large-diameter portions 21, 23. In one of the small-diameter portions 25, there are formed four positioning depressions 26 which correspond to positioning protrusions 53b (see FIG. 4) provided on the mold assembly, and which are produced during vulcanization molding of the rubber elastic body 2. Through the positioning depressions 26, the medial sleeve 3 is exposed.

Figure 3:
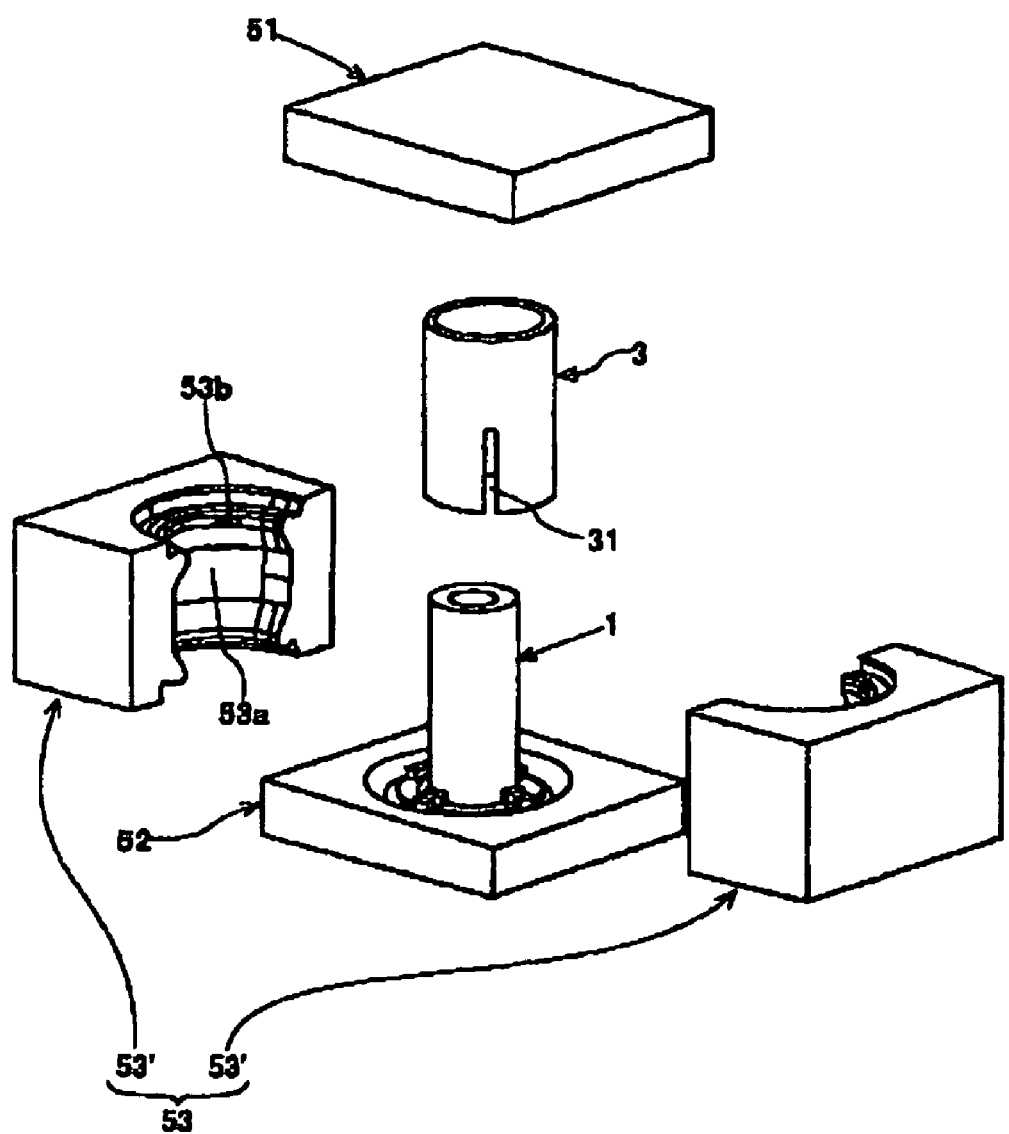
FIG. 3 is an exploded perspective view of a mold assembly used in the present embodiment.
Figure 4:
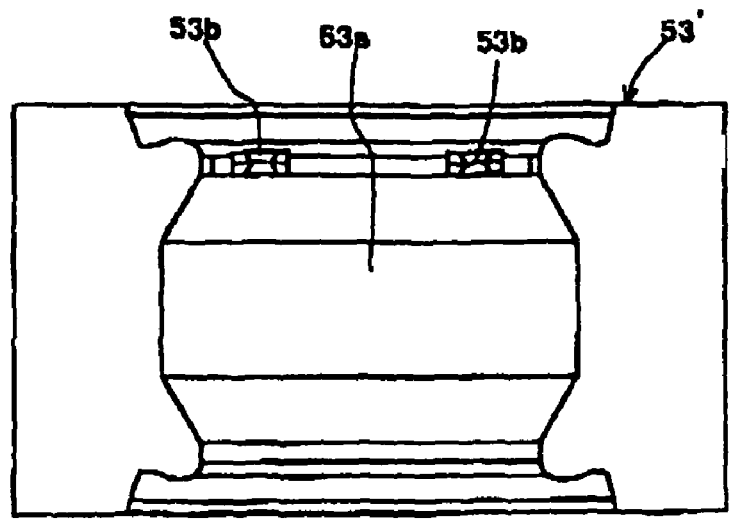
FIG. 4 is a front view showing a cavity faces of the intermediate molds of the mold assembly.
Figure 5:
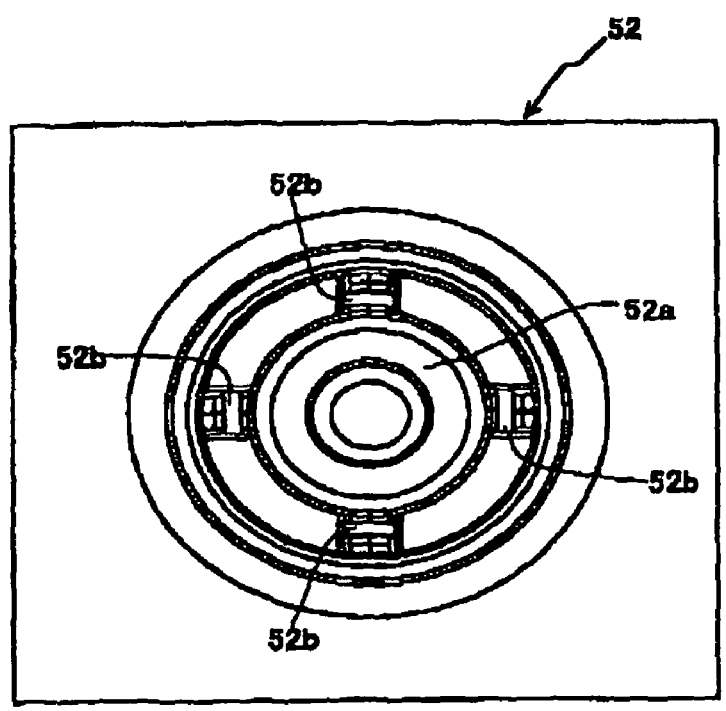
FIG. 5 is a top plane view of a lower mold of the mold assembly.

This vibration damping bushing is manufactured through vulcanization molding of the rubber elastic body 2 together with the main shaft member 1 and the medial sleeve 3, using the mold assembly depicted in FIGS. 3 through 5. As shown in FIG. 3, the mold assembly used in the embodiment is composed of an upper mold 51 and a lower mold 52 positioned spaced some distance apart in the vertical direction, and an intermediate mold 53 splits into two sections 53', 53' in the circumferential direction and positioned between the upper mold 51 and the lower mold 52. In the present embodiment, each section 53' has a semi-circumferential length of the intermediate mold 53.

As shown in FIG. 5, a ring groove 52a is provided in the center portion of the upper face of the lower mold 52, for the purpose of holding and positioning the lower end of the main shaft member 1 resting in the vertical direction on the lower mold 52. To the outer peripheral side of the ring groove 52a is disposed a positioning portion 52b for the purpose of holding and positioning the lower end of the medial sleeve 3 which has been positioned resting coaxially with the main shaft member 1 on the lower mold 52. The positioning portion 52b is constituted by slots situated at four equidistant locations along the circumference and extending in the circumferential direction, and takes the form of discontinuous segments lying in the circumferential direction. The positioning portion 52b is designed such that the circle described by the slots at the four locations are concentric with the circle described by the ring groove 52a. While the lower face of the upper mold 51 has not been provided with a ring groove 52a or positioning portion 52b corresponding to those provided on the upper face of the lower mold 52, these could be provided on the lower face of the upper mold 51 as well.

As shown in FIG. 4, a cavity defining face composed of two cavity faces 53a, 53a for molding the rubber elastic body 2 are formed on the opposing faces of the mutually opposed pair of sections 53', 53' of an intermediate mold 53. At four locations in the circumferential direction on the cavity faces 53a, 53a there are formed positioning protrusions 53b spaced equal distance apart in the circumferential direction for the purpose of positioning the medial sleeve 3. Specifically, the four positioning protrusions 53b are positioned in a balanced manner at axis-symmetric locations spaced 90° apart. These positioning protrusions 53b are disposed in a region corresponding to one of the small-diameter portions 25 of the rubber elastic body 2, and are situated towards the upper side from the axially center portion of the intermediate mold 53. In other words, the positioning protrusions 53b are located at either semi-circumference of the cavity defining face with any diametric line interposed therebetween. This pair of sections 53', 53' of the intermediate mold 53 are disposed so as to be extendable and retractable in the direction of their opposition (the centripetal direction) by means of an actuating device (not shown).

The aforementioned vibration damping bushing is manufactured according to the method described hereinafter, using the mold assembly constituted in the above manner. First, the main shaft member 1 is positioned resting in a vertical attitude (i.e. with the direction of its axis aligned with the vertical), with one end thereof (the lower end) positioned in the ring groove 52a which has been provided on the upper face of the lower mold 52 of the mold assembly (see FIG. 3). Next, the medial sleeve 3 is positioned resting in a vertical attitude (i.e. with the direction of its axis aligned with the vertical), with one end thereof (the lower end) positioned in the positioning portion 52b which has been provided on the upper face of the lower mold 52. The medial sleeve 3 is thereby positioned coaxially with respect to the main shaft member 1 while spaced apart a prescribed distance from its outside peripheral face. A slot 31 is provided in a prescribed region of the medial sleeve 3 in order that the rubber material injected into the mold assembly may easily migrate to the inside or outside of the medial sleeve 3 during vulcanization molding. The lower mold 52, with the main shaft member 1 and the medial sleeve 3 set on it as discussed above, is transported to a prescribed location for the next step.

In the next step, the pair of sections 53', 53' are set on the lower mold 52. In this instance, the pair of sections 53', 53' of the intermediate mold 53 will be advanced by the actuating device in the direction of their opposition (the centripetal direction with respect to the center axis of the main shaft member 1). At this time, if the medial sleeve 3 on the lower mold 52 should happen to shift out of position by tilting or riding up on the positioning portion 52b during transport, the outside peripheral face of the medial sleeve 3 will be pushed in the centripetal direction by the positioning protrusions 53b disposed on the sections 53', 53' of the intermediate mold 53 advancing in the centripetal direction. The position of the medial sleeve 3 in the centripetal direction will be corrected thereby so that it is positioned at the correct location coaxial with the main shaft member 1.

Thereafter, the lower mold 52 on which the pair of sections 53', 53' of the intermediate mold 53 have been set will again be transported to a prescribed location for the next step, where the upper mold 51 will be set from above and locked thereby, then transported to the location of the vulcanizer. In the vulcanizer, a rubber material will be injected into the cavity of the mold assembly, and vulcanization molding will be carried out. The resultant vulcanization molded article will then be subjected to prescribed post-processing steps as needed, to complete the vibration damping bushing of FIGS. 1 and 2.

In the vibration damping bushing manufactured in the above manner, the four depressions 26 which correspond to the positioning protrusions 53b are formed on the outside peripheral face of the rubber elastic body 2 through vulcanization molding carried out with the outside peripheral face of the medial sleeve 3 positioned by positioning protrusions 53b disposed on the sections 53', 53'.

According to the method of manufacturing the vibration damping bushing of the present invention as set forth hereinabove, during the process of vulcanization molding of the rubber elastic body 2, the medial sleeve 3 resting on the lower mold 52 will be positioned in the diametrical direction by the positioning protrusions 53b which are provided on the cavity faces 53a, 53a of the sections 53', 53' of the intermediate molds 53 moving in the centripetal direction, whereby it will be possible to improve the accuracy of positioning of the medial sleeve 3 with respect to the lower mold 52, as well as to improve coaxiality of the medial sleeve 3 with respect to the main shaft member 1. It will therefore be possible to carry out vulcanization molding with the medial sleeve 3 positioned accurately within the mold assembly, so that a vibration damping bushing of improved dimensional accuracy and less variability in characteristics can be obtained.

In the present embodiment, the medial sleeve 3 can be positioned with a high degree of accuracy due to balanced placement of the four positioning protrusions 53b at axis-symmetric locations spaced 90° apart. Also, by placing the four positioning protrusions 53b at locations towards the upper side from the center portion of the sections 53', 53', the medial sleeve 3 will be positioned at its upper end a considerable distance from its lower end positioned by the positioning portion 52b, whereby tilting of the medial sleeve 3 in the axial direction can be corrected to good advantage.

In the present embodiment, while the ring groove 52a and the positioning portion 52b are formed in the lower mold 52, these are formed in the upper mold 51 in addition, as stated above. With this respect, a component for positioning the main shaft member 1 and the medial sleeve 3, like the ring groove 52a and the positioning portion 52b, may preferably be a engagement projection to be fitted onto inner and/or outer circumferential surfaces of the main shaft member 1 and the medial sleeve 3 so as to prevent displacement of the main shaft member 1 and the medial sleeve 3 in the axis-perpendicular direction. To meet this end, the component for positioning the main shaft member 1 and the medial sleeve 3 should be located at either semi-circumferential side thereof with any diametric line interposed therebetween, like the positioning protrusions 53b.

As will be understood from FIG. 1, the rubber elastic body 2 includes: a central thick walled portion 22 extending circumferentially with a mountain-like cross sectional shape; a pair of annular thick large-diameter portions 21, 23 located at axially opposite ends thereof; and a pair of thin small-diameter portions 24, 25 of annular shape disposed between the central thick walled portion 22 and the annular thick large-diameter portions 21, 23, each having a diameter smaller than those of the central thick walled portion 22 and annular thick large-diameter portions 21, 23. The axially upper thin small-diameter portion 25 is provided with four positioning depressions 26 at a bottom portion thereof. Thus, an outer peripheral face of the medial sleeve 3 is exposed through the positioning depressions 26, or alternatively the bottom portion of the diameter portion 25 has a relatively small thickness due to the positioning depressions 26. The positioning depressions 26 are discontinuous in a circumferential direction, while being located at either semi-circumference of the thin small-diameter portion 25 with any diametric line interposed therebetween.

The positioning depressions 26 makes it possible to directly support the medial sleeve 3 in position relative to the cavity faces 53a in the axis-perpendicular direction, by means of positioning protrusions 53b formed on the cavity faces 53a of the section 53' of the intermediate mold 53, when executing vulcanization molding of a rubber material to form the rubber elastic body 2. Thus, it is possible to hold stably the medial sleeve 3 within the mold cavity against the injection pressure or the like, upon vulcanization molding of the rubber elastic body 2 before and during injecting the rubber material into the mold cavity.

In the present embodiment, the upper thin small-diameter portion 25 disposed is provided with the positioning depressions 26, while the lower thin small-diameter portion 24 has no positioning depression so that the medial sleeve 3 is not exposed and entirely covered by the rubber elastic body 2. On the other hand, the lower end of the medial sleeve 3 is supported in position in the axis-perpendicular direction by means of the positioning portion 52b. By this combination use of the positioning depressions 26 and the positioning portion 52b, the medial sleeve 3 is effectively supported in position. In the lower end of the medial sleeve 3 being positioned by means of the lower mold 52, in particular, the rubber elastic body 2 is obtained sufficiently over the entire circumference thereof, thus ensuring fluidity of the rubber material within the mold cavity.

Figure 6:
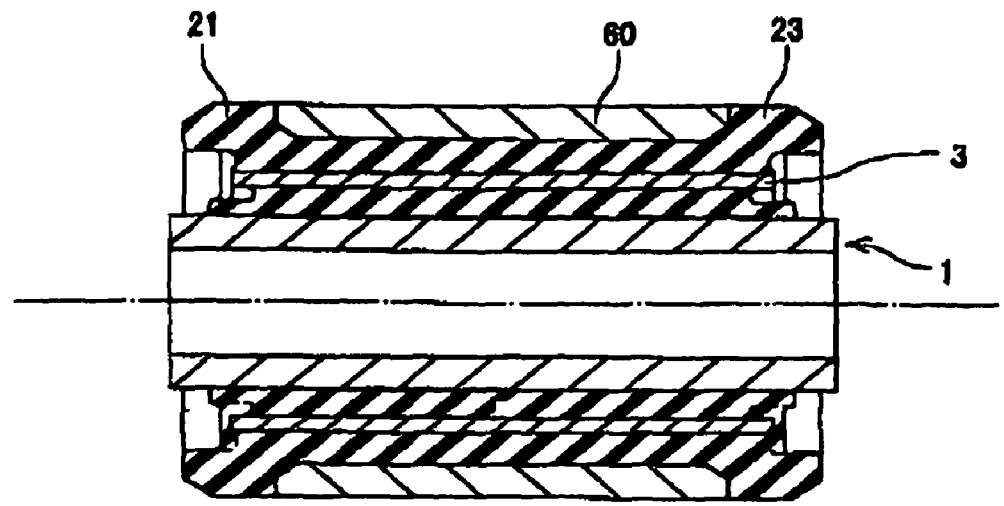
FIG. 6 is an axial cross sectional view of the vibration damping bushing in the state assembled within a mounting hole.

The vibration damping bushing of the present embodiment is adapted to be press-fitted into a bushing mounting hole of an outer tubular member 60 as shown in FIG. 6. With the vibration damping bushing assembled within the bushing mounting hole, the rubber elastic body 2 undergoes elastic deformation so that the thick large-diameter portions 21, 23 are held in contact with axially opposite open end faces of the bushing mounting hole respectively, and the central thick walled portion 22 is compressed in a diametric direction so that the pair of thin small-diameter portions 24, 25 together with the positioning depression 26 undergo diameter increasing deformation, whereby not only an outer circumferential surface of the large-diameter portions 21, 23 but also an outer circumferential surface of the small-diameter portions 24, 25 are held in contact with an inner circumferential surface of the bushing mounting hole of the outer tubular member 60.

In general, vibration damping bushings, such as a suspension bushing, is required to exhibit desired damping characteristics and durability. To meet this end, such a vibration damping bushings are typically mounted in position with a give pre-compression applied in the radial direction. Thus, a rubber elastic body of the vibration damping bushing has an outside diameter greater than an inside diameter of the bushing mounting hole. Since Poisson's ratio of the rubber elastic body is 0.5, it is needed to form a space for releasing the compressed rubber elastic body. In the present embodiment, this space can be obtained by means of the thin small-diameter portions 24, 25 disposed on the axially opposite sides of the central thick walled portion 22 to be compressed in the diametric direction. Thus, the specific structure of the vibration damping bushing of the present embodiment is suitable for executing sufficient pre-compression in the radial direction, while preventing excess stress to the rubber elastic body 2. That is, the annular thin small-diameter portions 24, 25 are formed necessarily at axially both sides of the medial sleeve 3. It should be noted that the present invention has been developed by effectively utilizing this structural features of the vibration damping bushing and provides unique positioning structure of the medial sleeve 3 in the axis-perpendicular direction within the mold cavity. Therefore, the present invention makes it possible to the unique positioning structure of the medial sleeve 3, without decreasing a volume of the rubber elastic body 2 more than needed, and without adverse effect on the rubber elastic body 2 and vibration damping characteristics of the bushing. This is the notable technical advantage of the present invention.

In addition, when the vibration damping bushing is press-fitted into the bushing mounting hole of the outer tubular member 60, the thin small-diameter portions 25 where the positioning depressions 26 are formed, are filled by a mount of rubber elastic body 2 expanded to the axially both sides of the central thick walled portion 22 that is pre-compressed in the radial direction, and are substantially vanished. Thus, a part of the medial sleeve 3 exposed through the positioning depressions 26 never of is less likely to suffer from rust, corrosion, water pool or other drawbacks. That is, in the mounted state of the vibration damping bushing, the presence of the positioning depressions 26 is vanished. This is also the advantage of the present invention.

Figure 7:
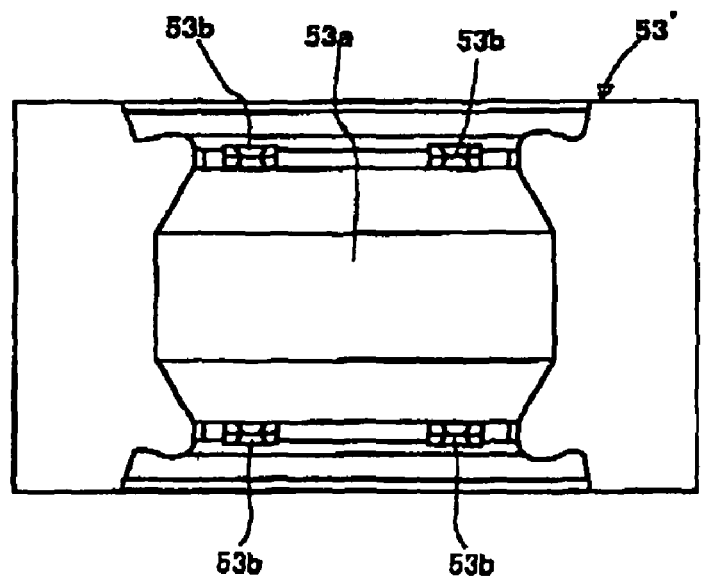
FIG. 7 is a front view showing a cavity face of the intermediate molds of the mold assembly according to another embodiment.

According to another preferred form, the positioning protrusions 53*b* are disposed at two or more locations lying in an axial direction as shown in FIG. 7. This arrangement ensures further strict positioning of the medial sleeve 3 within the mold cavity.

What is claimed is:

1. A method of manufacturing a vibration damping bushing including (i) a main shaft member, (ii) a rubber elastic body of tubular shape affixed to an outside peripheral face of the main shaft member, and (iii) a medial sleeve of tubular shape embedded coaxially in a medial region of the rubber elastic body in a thickness-wise direction thereof, the method comprising the steps of:

(A) employing a mold assembly composed of an upper mold and a lower mold positioned spaced a distance apart in a vertical direction, and an intermediate mold to form a tubular cavity defining face extending about a center axis vertically extending between the upper and lower molds, said intermediate mold being split a plurality of sections in a circumferential direction of the cavity defining face, with each of the plurality of sections movable forward and backward in a centripetal direction between the upper and lower molds;

(B) after setting in the mold assembly the main shaft member and the medial sleeve so as to be positioned coaxially with each center axis extending in the vertical direction between the upper and lower molds, filling a mold cavity of the mold assembly with a rubber material and then the rubber material is vulcanized so that the rubber elastic body is simultaneously bonded to the main shaft member and the medial sleeve, wherein:

after setting the main shaft member on the lower mold so as to project vertically upward while positioning a lower end of the main shaft member with respect to the lower mold, the medial sleeve is set so as to be disposed about the main shaft member, and the plurality of sections are moved forward in the centripetal direction from an outer peripheral side to form the intermediate mold together, and then the upper mold is superposed onto the intermediate mold from a vertically upper side to form the mold cavity therein, at least one positioning protrusion is formed on the cavity defining face, the positioning protrusion being discontinuous in the circumferential direction, while being located at either semi-circumference of the cavity defining face with any diametric line interposed therebetween, and the medial sleeve is set in position in an axis-perpendicular direction within the mold cavity by holding the positioning protrusions in contact against an outer peripheral face of the medial sleeve, the positioning protrusions are positioned only on an axially upper side of an axially central portion of the cavity defining face so that the positioning protrusions are adapted to hold an upper end position of the medial sleeve, and only the lower mold of the mold assembly is furnished with a positioning portion for positioning a lower end portion of the medial sleeve, the positioning portion has a form of rectangular cross-sectional slot discontinuous in a circumferential direction.

2. The method of manufacturing a vibration damping bushing according to claim 1, wherein the at least one positioning protrusion comprises three or more positioning protrusions separated from one another in the circumferential direction.

3. The method of manufacturing a vibration damping bushing according to claim 1, wherein the at least two positioning protrusions are disposed at two or more locations lying in an axial direction.

4. The method of manufacturing a vibration damping bushing according to claim 1, wherein at least four positioning protrusions are provided at axis-symmetric locations spaced 90° apart.

* * * * *